(12) United States Patent
Coates, Jr.

(10) Patent No.: US 11,512,485 B2
(45) Date of Patent: Nov. 29, 2022

(54) COLUMN BRACKET ASSEMBLY AND RELATED METHODS AND STRUCTURES

(71) Applicant: Thomas B. Coates, Jr., Brighton, MI (US)

(72) Inventor: Thomas B. Coates, Jr., Brighton, MI (US)

( * ) Notice: Subject to any disclaimer, the term of this patent is extended or adjusted under 35 U.S.C. 154(b) by 0 days.

(21) Appl. No.: 17/346,198

(22) Filed: Jun. 11, 2021

(65) Prior Publication Data

US 2022/0003011 A1 Jan. 6, 2022

Related U.S. Application Data

(60) Provisional application No. 63/047,310, filed on Jul. 2, 2020.

(51) Int. Cl.
| | | |
|---|---|---|
| *E04G 25/00* | (2006.01) | |
| *E04B 1/26* | (2006.01) | |
| *E04C 3/36* | (2006.01) | |
| *E04H 12/18* | (2006.01) | |
| *E04H 12/04* | (2006.01) | |
| *E04H 12/30* | (2006.01) | |

(52) U.S. Cl.
CPC ............ *E04G 25/00* (2013.01); *E04C 3/36* (2013.01); *E04H 12/04* (2013.01); *E04H 12/187* (2013.01); *E04H 12/30* (2013.01); *E04B 2001/2644* (2013.01); *E04G 2025/006* (2013.01)

(58) Field of Classification Search
CPC ..... E04G 25/00; E04G 2025/006; E04C 3/36; E04B 1/2608; E04B 1/2644; E04B 1/2652
See application file for complete search history.

(56) References Cited

U.S. PATENT DOCUMENTS 1,665,782 A * 4/1928 Hanna ................... E04B 1/2604
52/690
1,787,167 A * 12/1930 Purdy ................... E04B 1/2604
16/249
(Continued)

FOREIGN PATENT DOCUMENTS

DE 102009031520 A1 * 1/2011 ............. E04G 25/06
DE 202011000219 U1 * 12/2011 ............. E04G 25/06
(Continued)

OTHER PUBLICATIONS

Machine-assisted translation of EP1182309B1 (description), obtained from https://worldwide.espacenet.com/ on Jun. 23, 2021.

*Primary Examiner* — Michael Safavi
(74) *Attorney, Agent, or Firm* — Warner Norcross + Judd LLP

(57) ABSTRACT

A column bracket assembly is provided. The column bracket assembly comprises a bottom base bracket and a top base bracket, each including a bracket body adapted to receive an end of support element (e.g. a wooden column) and a mounting bracket/plate pivotally coupled to the bracket body and adapted to be coupled to a structural element (e.g. a footing, pile, header, beam etc.). The column bracket assembly optionally includes mounting brackets for installing cross brace brackets and/or tension rods to the bracket bodies. A method of installing the column bracket assembly, and a method of repairing, resettling, shoring, and/or leveling a structure with the column bracket assembly are also provided, along with structures comprising the column bracket assembly.

29 Claims, 6 Drawing Sheets

(56) References Cited

U.S. PATENT DOCUMENTS

| | | | |
|---|---|---|---|
| 2,629,906 A * | 2/1953 | Holmes | E04B 1/2604 |
| | | | 403/187 |
| 5,186,430 A | 2/1993 | Ellithorpe | |
| 5,456,441 A | 10/1995 | Callies | |
| 5,561,950 A | 10/1996 | Collins et al. | |
| 6,272,798 B1 | 8/2001 | Cockman | |
| 6,343,449 B1 | 2/2002 | MacKarvich | |
| 8,959,857 B1 | 2/2015 | Lin | |
| 9,045,895 B1 * | 6/2015 | Lin | E04B 2/70 |
| 9,677,297 B2 | 6/2017 | Warner et al. | |
| 9,932,718 B2 | 4/2018 | Blevins et al. | |
| 10,273,707 B1 | 4/2019 | Fox | |
| 2005/0016111 A1 * | 1/2005 | Knepp | E04C 3/36 |
| | | | 52/633 |
| 2007/0102603 A1 * | 5/2007 | Newell | F16M 11/10 |
| | | | 248/219.2 |
| 2007/0267552 A1 | 11/2007 | Meyer | |
| 2009/0101774 A1 * | 4/2009 | Shih | E04G 25/065 |
| | | | 248/200.1 |

FOREIGN PATENT DOCUMENTS

| | | | | |
|---|---|---|---|---|
| EP | 1182309 B1 | | 12/2003 | |
| GB | 2170525 A | * | 8/1986 | E02D 17/04 |
| GB | 2548615 A | * | 9/2017 | E04G 11/483 |
| WO | WO-8303438 | * | 10/1983 | E04G 25/00 |
| WO | WO-2019113163 A1 | * | 6/2019 | E04B 1/0046 |

\* cited by examiner

COLUMN BRACKET ASSEMBLY AND RELATED METHODS AND STRUCTURES

FIELD OF THE INVENTION

The present disclosure relates generally to load bearing support columns and column assemblies and, more specifically, to a column bracket assembly adapted to be fitted onto opposing ends of support elements to form a highly adaptable column.

BACKGROUND OF THE INVENTION

Many buildings and structures are placed on a foundation utilizing concrete footings. Such footings vary widely, from simple spread footings to stepped/pedestal footings, strap footings, mat footings, and the like, which may be used to support a single column or multiple columns (e.g. in the case of mat or raft foundations, combined footings, etc.). Other types of foundations may utilize pile foundations, which include a number of piles used to support a pile cap, which in turn acts as a footing to support columns or other such structural elements (e.g. masonry blocks, concrete walls, wood or concrete piles, etc.) in a manner similar to the footings above.

Unfortunately, the common foundation motif suffers from a number of drawbacks, especially in terms of susceptibility to damage and, ultimately, loss of structural integrity, due to adverse weather conditions. For example, in addition to water-based deterioration under normal circumstances, such foundation systems are known to fail zones frequented by flooding and/or seismic activity. Specifically, observations from earthquakes have shown that pile-type structural elements, such as foundations, are susceptible to significant damage when subjected to loads induced by large seismic events, often via liquefaction and lateral spreading of surrounding soil leading to column deformation. Vibration over time will also cause masonry units to crumble and even solid concretes to crack given the right conditions, such as those attributable to building shake from both natural (e.g. wind, seismic activity, etc.) and man-made activities (e.g. heavy traffic from roadways, railways, etc.).

These issues are may be even more severe in cases of flooding, where soil erosion, especially in instances where the surrounding soil contains layers with large differences in stiffness, can lead to column warp and failure, washout, etc. In severe instances, such as in high wind areas caused by hurricanes, structures have been lifted or pushed off of foundations altogether, necessitating extreme measures to resettle and relevel buildings if such structures can even be saved. Unfortunately, however, the installation of new foundational elements, or even proactive retrofitting of existing foundation elements to repair or mitigate such damage is prohibitively costly and labor intensive, often requiring a house lifter to lift and move a structure during the foundation repair. In areas of vast destruction and damage, e.g. coastal areas hit by tropical storms, contractors and specialists in structural raising and foundation repair are unable to keep up with the inevitable spikes in localized demand and labor shortages and, even where available, cannot service every structure in need in a timely and cost effective manner.

BRIEF SUMMARY OF THE INVENTION

A column bracket assembly is provided. The column bracket assembly comprises a bottom base bracket and a top base bracket. The bottom base bracket includes a bracket body adapted to receive an end of support element (e.g. a wooden column), a base plate pivotally coupled to the bracket body and adapted to be coupled to a foundation element (e.g. a footing, pile, etc.), and, optionally, mounting brackets for installing cross brace brackets and/or tension rods to the bracket body. The top base bracket includes a mounting body similar to the bottom base bracket and adapted to receive another end of support element (e.g. opposite the bottom base bracket), a header bracket pivotally coupled to the bracket body and adapted to be coupled to a supported element (e.g. a header, beam, etc.), and, optionally, mounting brackets for installing cross brace brackets and/or tension rods to the bracket body (e.g. extending from/anchored to another support element, a base bracket of an adjacent column bracket assembly, etc.).

A method of installing the column bracket assembly (the "installation method") is also provided. The method includes coupling the top base bracket to a supported element via the header bracket, coupling the bottom base bracket to a foundation element via the base plate, coupling one end of a support element to the bracket body of the top base bracket, and coupling another end of the support element to the bracket body of the bottom base bracket. In certain embodiments, the method further comprises coupling a cross brace to the top and/or bottom base brackets via the cross brace mounting brackets.

A method of repairing, resetting, shoring, and/or leveling a structure with the column bracket assembly (the "supporting method") is also provided, and includes installing the column bracket assembly, e.g. via the installation method, on an existing structure having a damaged and/or compromised foundation support system.

A structure comprising the column bracket assembly is also provided. In some embodiments, the structure is a house. In particular embodiments, the structure is a pool. In specific embodiments, the structure is a water tower pool (i.e., an elevated pool comprising a water barrel for housing swimming water atop a supported element being supported by at least one support element installed and secured via the column bracket assembly.

These and other objects, advantages, and features of the invention will be more fully understood and appreciated by reference to the description of the current embodiment and the drawings.

DETAILED DESCRIPTION OF THE INVENTION

A column bracket assembly is provided. The column bracket assembly provides a highly-adaptable platform useful in creating, reinforcing, repairing, and/or retrofitting structures relying on foundational support columns. The column bracket assembly provides an improved design that allows for installation with simple and readily available carpentry tools with minimum labor, at a fraction of the cost of typical installation and/or reparation methods common in the construction industry, especially those directed to foundations and structural shoring.

As will be appreciated from this disclosure in view of the drawings, the column bracket assembly is adapted for anchoring horizontal beams to poured footings via structural columns (e.g. wood columns, beams, etc.). Unlike many conventional brackets and methods for laterally supporting support columns, the column bracket assembly allows for the use of both level and sloped grade conditions without need for additional assembly components. Moreover, the column bracket assembly provides readily accessible means for attaching lateral cross braces between adjacent column assemblies, which, couples with the particular bracket design described below, allows for a user to orient structural supports at any angle to account for unique location conditions, as well as to provide additional bracing and support/resilience against lateral forces owing to wind. Further still, the column bracket assembly works with readily available materials (e.g. lumber, wood beams/boards, etc.), which, especially when combined with the cross-bracing introduced above, provides a structural support system capable of both flexing in response to lateral force as well as absorbing otherwise harmful vibrations without the mechanical failure exhibited by many conventional systems under the same circumstances.

Exemplary embodiments of the column bracket assembly are described below to illustrate one configuration that provides a user a convenient, cost-effective, versatile assembly adapted for supporting heavy loads over long time periods and adverse conditions in order to build, support, and/or retrofit buildings and structures in need thereof. It will be appreciated that certain features of the column bracket assembly, including the ease of installation, low labor and time costs, and widely-adapted/standardized fittings also allow for easy and convenient maintenance and, if needed, replacement or one or more components of the assembly. Various features and advantages of the column bracket assembly will become apparent from the description these embodiments, especially when viewed in accordance with the accompanying drawings. Additionally, it will be appreciated that certain features of the column bracket assembly, including individual components and any combination thereof, are functional, but can be implemented in different aesthetic configurations.

Figure 1:
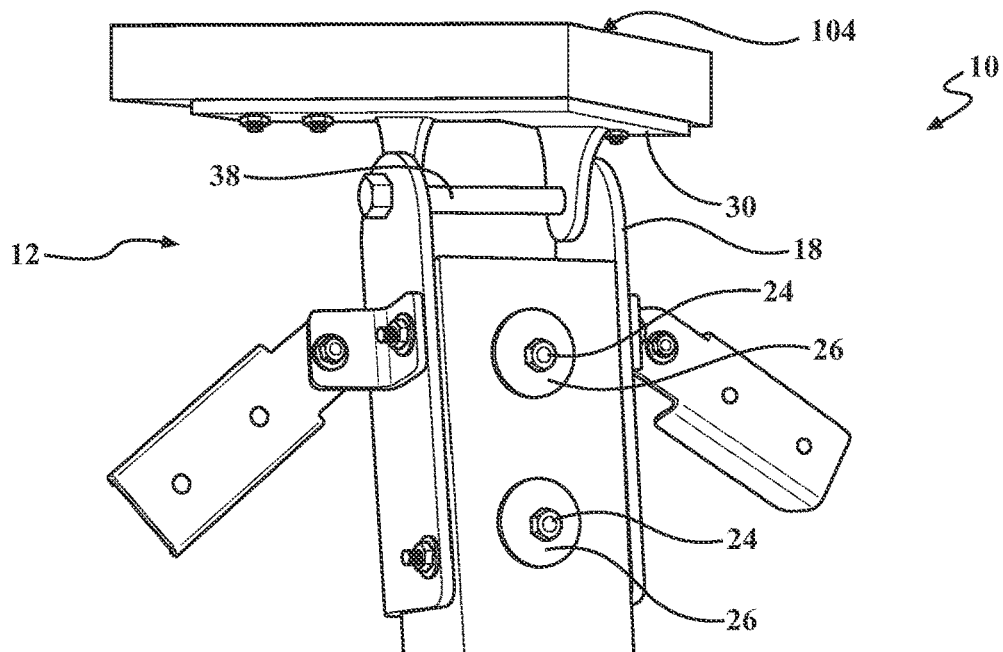
FIG. 1 is a perspective drawing of a column bracket assembly, and shows a top base bracket installed on a horizontal beam, a bottom base bracket installed on a concrete footing via a base plate, and a wood column installed in the top and bottom base brackets to from an installed column bracket assembly.
Figure 1:
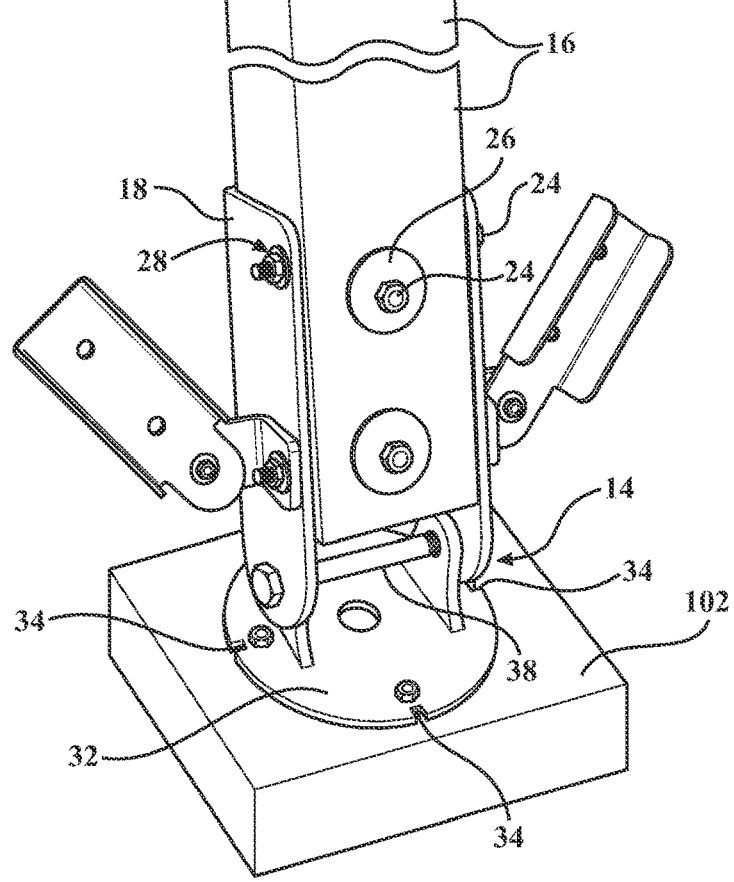

With reference to the specific embodiment of the Figures, wherein like numerals generally indicate like parts throughout the several views, the column bracket assembly is shown generally at 10. As shown in FIG. 1, the column bracket assembly 10 (hereafter, the "assembly 10") comprises a pair of base brackets 12, 14 adapted to be coupled to opposing ends of a support element 16. The base brackets 12, 14 are also adapted to be coupled to foundational elements of a structure 100 (e.g. footing 102, beam/header 104, etc.) to secure in place the support element 16 to support (i.e., bear load, hold up, tie together, etc.) the structure 100 in place.

In general, the pair of base brackets 12, 14, also referred to individually as the top base bracket 12 and the bottom base bracket 14, are similar in structure and function, and thus may be described in terms of certain common features. For example, each of the base brackets 12, 14 generally comprises a bracket body 18, which is a 3-sided bracket with a built-in column support shelf 20 for supporting an end of the support element 16, while also spacing the end from other components of the base bracket (12, 14). While many particular configurations are possible, it will be appreciated that the bracket body 18 is assembled in such a way as to hold and, in the case of the bottom base bracket 14 uplift, the support element 16 while keeping the sides from spreading under load (e.g. where the support element 16 comprises a spreadable material, such as wood or another of the materials described below). The 3-sided feature enables an installer/user to pre-build a column bracket assembly 10 to length and, if need be, replace a column/support element 16 if damaged or otherwise requires a post-installation length alteration due to settling, ground movement, and/or site elevation variation over time.

It will be appreciated that the support element 16 is not particularly limited, and may comprise, alternatively may be, any material or combination of materials suitable for use as a structural support. Examples of support elements 16 generally include rods, beams, poles, columns, pipes, struts, studs, piles, tubes, bollards, and the like. Likewise, depending on a given application/intended use, the support element 16 may be of any suitable size or proportion, and may have any cross-sectional shape (e.g. circular, elongate, or square cross-section) or configuration. In addition, the support element 16 can be constructed of any suitable material, such as concrete, metal, wood, plastic, masonry, stone, and combinations thereof. In general, the support element 16 is a wooden column, such as a 6×6, 8×8, 10×10, 12×12, etc., or piece of dimensional lumber (i.e., framing lumber, stud lumber, etc.), or a combination of multiple boards or pieces of dimensional lumber utilized together to reach such a size/dimension (e.g. multiple 2×6 or 2×8 planks disposed face-to-face, and optionally glued or otherwise held together with mechanical and/or chemical fasteners). In such instances, the wood may be treated, coated, painted, etc., as will be appreciated by those of skill in the art. For example, in some embodiments, the support element 16 is a cut-to-fit piece of unsawn timber log. In other embodiments, the support element 16 is a wooden, metal, or composite post, beam, or column.

Figure 2:
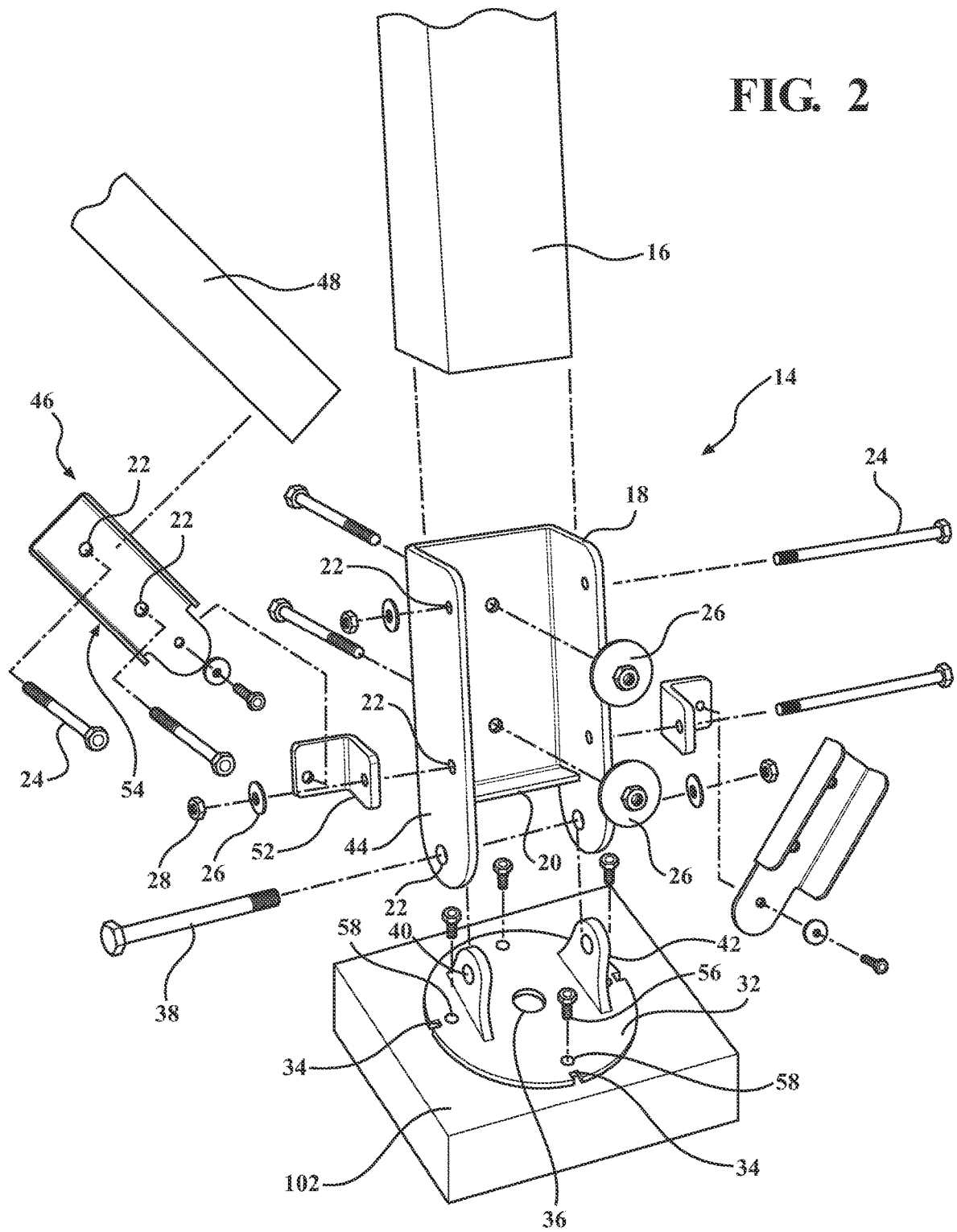
FIG. 2 is a side perspective drawing of a bottom base bracket of the column bracket assembly in a partially-exploded form, and shows the bottom base bracket installed on a concrete footing via a base plate, a cross brace bracket installed on the bottom base bracket via a mounting bracket, and a wooden cross brace installed in the cross brace bracket.
Figure 3:
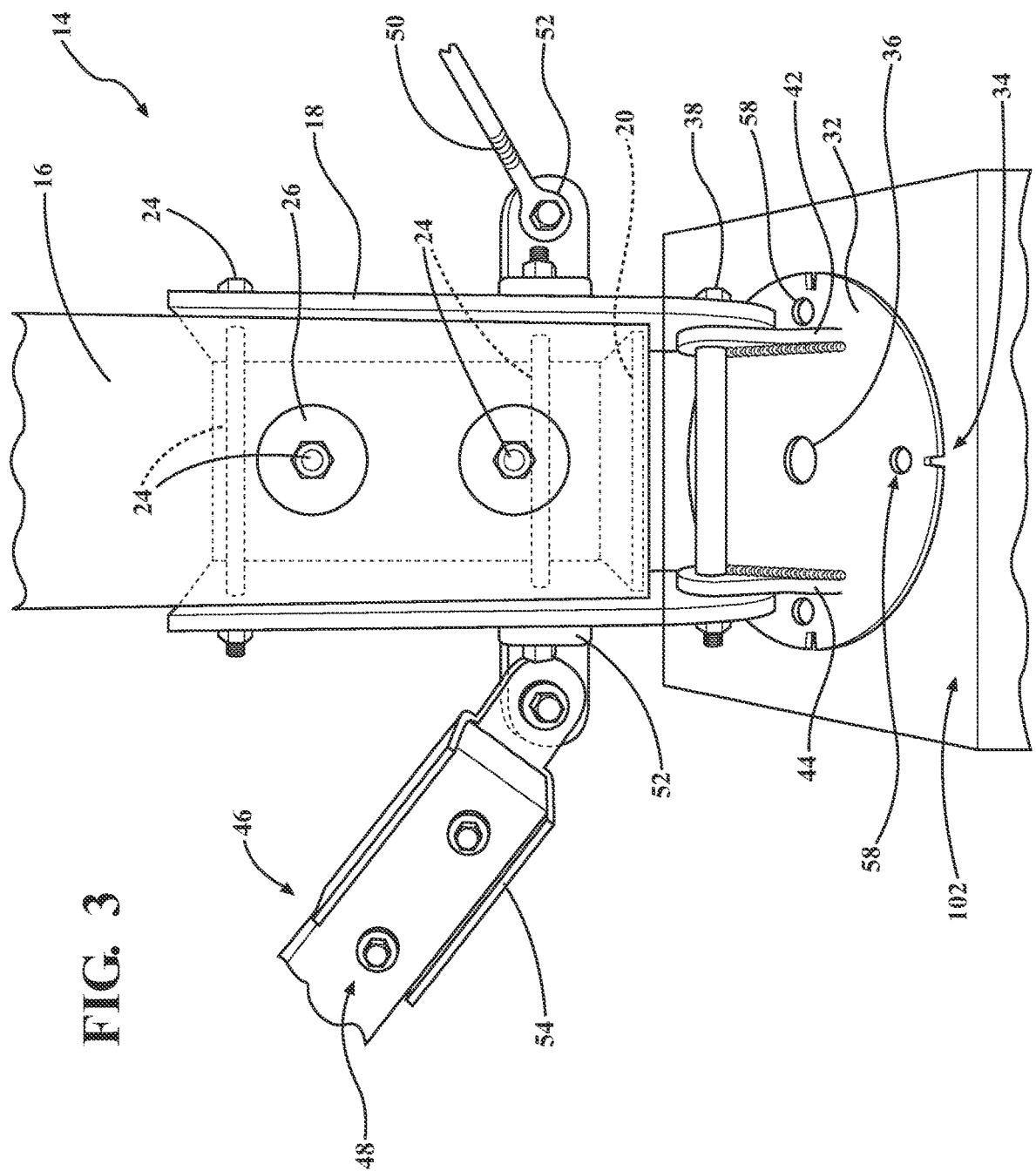
FIG. 3 is a front elevated drawing of the a bottom base bracket of the column bracket assembly in a fully-assembled form, and shows the same features of the bottom base bracket of FIG. 2, as well as a tension rod installed on the bottom base bracket via a mounting bracket opposite the cross brace bracket, and a wood column installed and coupled to the bottom base bracket.

As shown in FIG. 2, each of the base brackets 12, 14 comprises a number of bolt holes 22 through which column bolts 24 may be disposed to fasten the support element 16 to the bracket body 18. As shown in FIGS. 2 and 3, conventional fasteners may be utilized, such us as high-strength column bolts 24 with large compression washers or spacers 26, which enable securing/lock nuts 28 to be tightened more than a standard washer and provide additional compression support to prevent spreading at the base of the support element 16 when under load. In certain instances, the washers 26 used in the open-ended portion of the bracket body 18 may be replaced with a single large compression plate (not shown), such as a single lock plate with small cleats to further bite into the support element 16 and create a secure compression fit of the ends thereof into the base brackets 12, 14.

Figure 4:
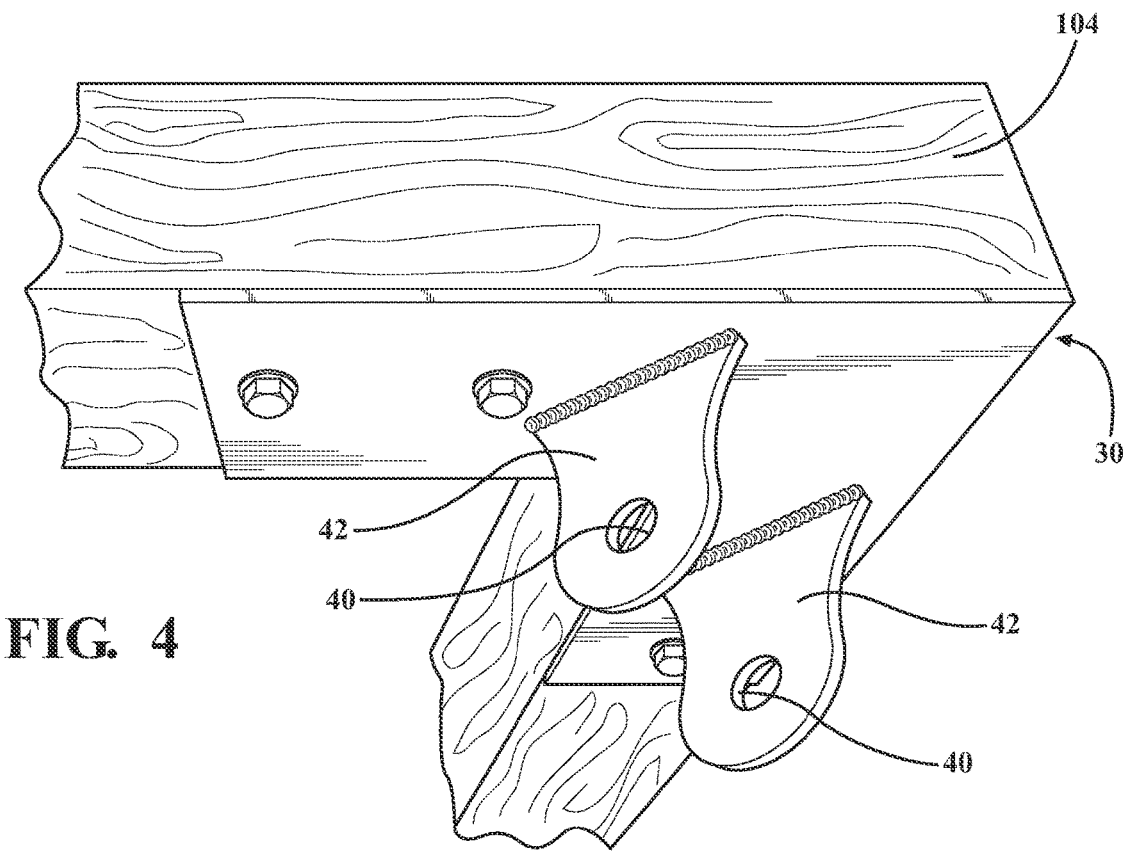
FIG. 4 is a bottom perspective drawing of a corner header bracket mounted to an angled header beam joint, and shows bracket tabs having pivot pin holes for receiving a pivot pin to couple the corner header bracket to a bracket body of a top base bracket of the column bracket assembly.
Figure 5:
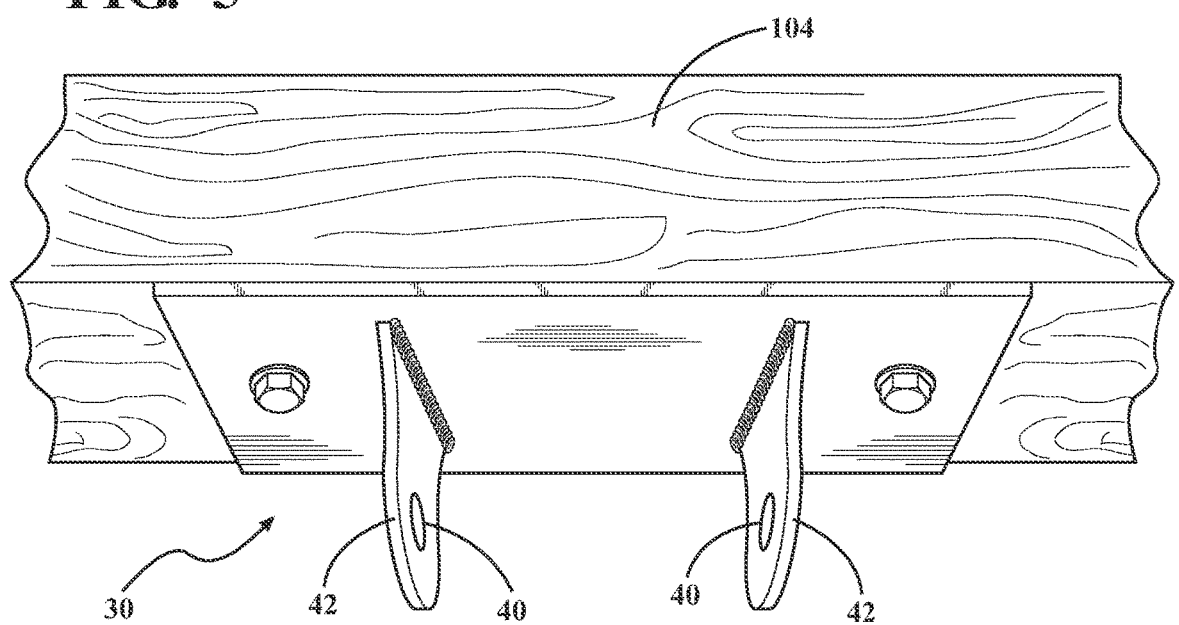
FIG. 5 is a bottom perspective drawing of a straight header bracket mounted to a header beam, and shows bracket tabs to couple the straight header bracket to a bracket body of a top base bracket of the column bracket assembly in a similar manner as the corner header bracket of FIG. 4.
Figure 6:
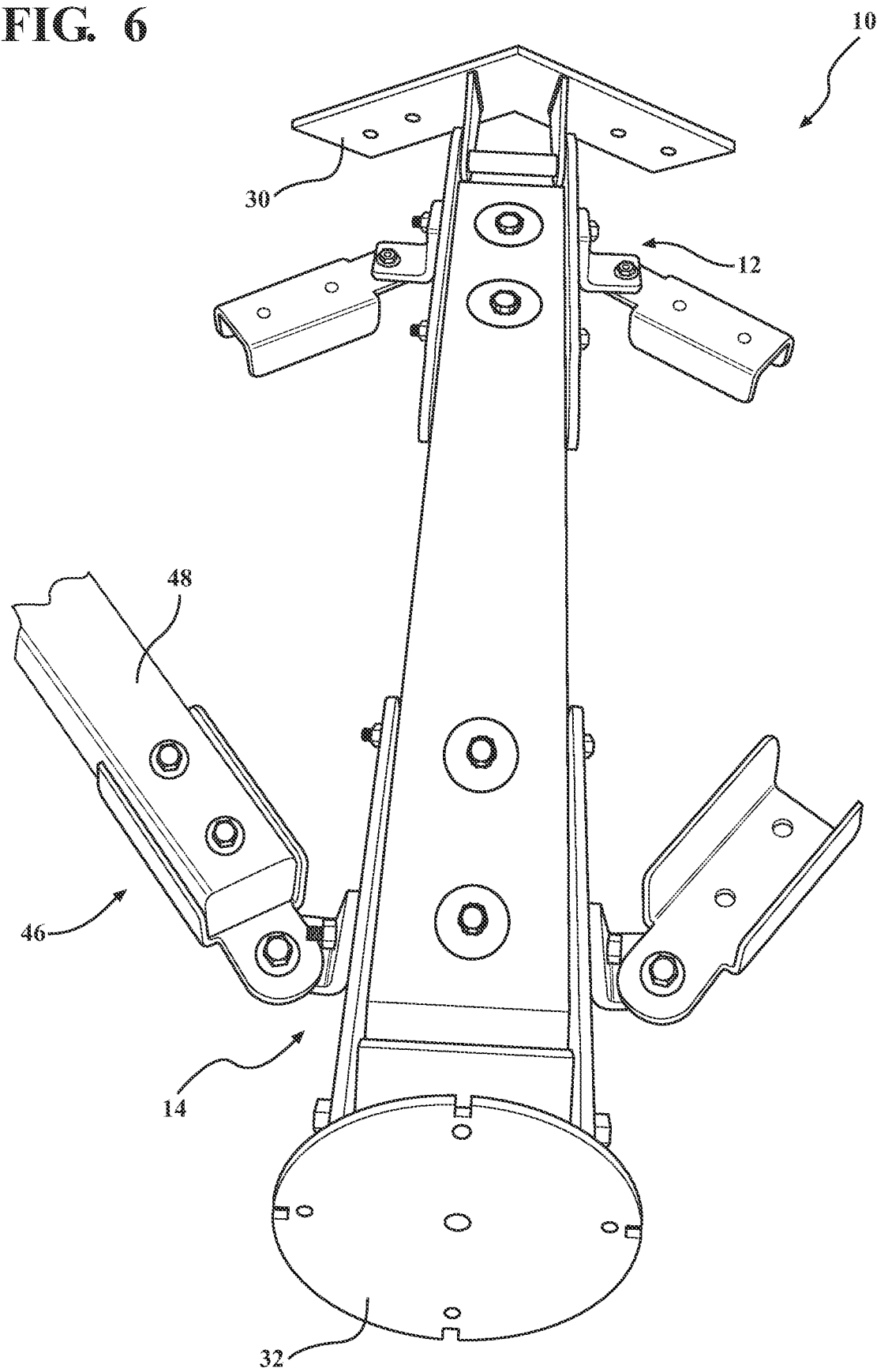
FIG. 6 is a photograph of the column bracket assembly, and shows a top base bracket coupled to a corner header bracket mounted to a mock-angled header beam joint, a bottom base bracket having a base plate and coupled to the top base bracket via a wood column, and cross brace brackets installed on opposing sides of each top and bottom base bracket for mounting cross braces thereto, and a mock wooden cross brace installed in one of the cross brace brackets of the bottom base bracket.

The top base bracket 12 and the bottom base bracket 14 typically differ in the manner in which each bracket is coupled to a respective element (e.g. beam 104, footing 102) of the structure 100 to be supported. In particular, the top base bracket 12 generally comprises a header bracket 30, e.g. for securing the top base bracket 12 to a supported element 104 (e.g. a header, beam, etc., or any other element to be supported by the support element 16 via the assembly 10). As shown in FIGS. 4 and 5, the top base bracket 12 may configured to be coupled to any portion of the supported element 104, such as a corner/joint (e.g. see FIG. 4) or simply a straight portion thereof (e.g. see FIG. 5). Conversely, the bottom base bracket 14 generally comprises a base plate 32, which is adapted to be secured to a base element 102, such as a concrete footing 102 shown generally at 1 in FIGS. 2-3.

While the top base bracket 12 will generally be placed and located conveniently by centering on the supported element 104, the base plate 32 of the bottom base bracket 14 may comprise locating markings 34, e.g. in the form of a slot, hole, protrusion, window, marking, graduated scale, etc. The base plate 32 may comprise any number of such locating markings 34, which may be independently selected and the same as, or different from, any other of the locating markings 34, e.g. in terms of type, length, location about the base plate 32, etc. It will be appreciated that alignment slots/locating markings 34 allow for ease of in-field layout. For example, string lines can be used to "square" the bottom base bracket 14 to a proper location on the footing 102 before being secured thereto. The alignment slots/locating markings 34 also provide additional fastening locations for extra anchor bolts if desired/needed. For example, in certain embodiments, the base plate 32 comprises a central alignment hole 36, which may double as a central anchor bolt hole (e.g. for use in marking a pilot hole into the footing 102 when the assembly 10 is roughed in, such that an accurate placement of the pilot hole may be achieved.

Each of the top base bracket 12 and the bottom base bracket 14 is independently pivotally connected/coupled to its respective mounting plate (i.e., the header bracket 30 and the base plate 32, respectively). As shown in FIGS. 2, 4, and 5, this connection is generally accomplished via use of a pivot pin 38 (e.g. a bolt secured via a lock nut or other fastener, such as a cotter pin, clip, etc.) (e.g. see FIG. 3), which is disposed though holes 22' in the side of the bracket body 18 as well as pivot pin holes 40 defined by bracket tabs/ears 42 of the respective base plate (30, 32) (e.g. see FIGS. 4-5). This pivoting design to allows for an adjustable and adaptive angle of the support element 16 to be selected, such as when installing the assembly 10 on a slope, attaching the header bracket 30 to a slanted beam, etc. In this way, any support element 16 utilized in the structure 100 may be placed in a vertical position or at a relative angle with regard to the ground, a portion of the structure 100, etc. Additionally, the use of this pivoting connecting provides a convenient point of disconnection/decoupling that can be used to facilitate repairing, replacing, or altering the support element 16 (e.g. to shorten or replace with a longer beam in response to environmental changes over time, etc.) by simply removing one or both pivot pin(s) 38 of the assembly 10, replacing/altering the support element 16, and reinstalling the pivot pin(s) 38.

As introduced above, and shown in FIGS. 1-5, the bracket tabs/ears 42 are attached to the mounting plates (30, 32). In particular, the each mounting plate (30, 32) comprises a pair of the bracket tabs 42, which are separated by a width selected collectively with the corresponding tabs 44 of the bracket body 18 to allow for alignment of pivot pin holes 22' and 40 and facilitate simple installation of the pivot pin 38. It will be appreciated that the distance of the pivot pin holes from each respective mounting plate (30, 32) will dictate the size of hardware/fasteners that may be utilized to secure the components of the assembly 10 together, e.g. where a larger distance/longer height allows for an anchor bolt (not shown) with larger proportions (e.g. in terms of head/nut size) in the central anchor/bolt hole 36. In general, with regard to the bottom base bracket 14, the center line of the pivot pin 38 is selected to be above the base plate 32 to raise the wood column from being close to grade and help prevent deterioration of the column 16 (e.g. from moisture, abrasion, rot, pests, etc.).

As shown in FIGS. 1-7, the assembly 10 may comprise additional braces 46, e.g. implemented as additional beam-type cross braces 48 (e.g. see FIGS. 3 and 6), tension rods 50 (e.g. see FIG. 3), or combinations thereof. The additional braces 46 may be coupled directed to the bracket body 18 of the top and/or bottom base brackets 12, 14, to the mounting bracket/plate (30, 32), or both. In certain embodiments, as shown in FIG. 3, the bracket body 18 comprises cross brace mounting brackets 52, which are adapted to be pivotally coupled to a cross brace bracket 54. Similar to the top and bottom base brackets 12, 14, the cross brace brackets 54 are adapted to be coupled to the end of the cross brace 48 (e.g. a wood board, steel beam, etc.) as well as to the bracket body 18, thereby securing the cross brace 16 thereto. Additionally, or alternatively, the cross brace mounting brackets 52 may be adapted to anchor the tension rod 50 to the bracket body 18. It will be appreciated that the additional cross braces 46 may be utilized in any number, direction, configuration, and combination, and may be configured to provide compression and/or tension-based bracing/support to the assembly 10. It will also be appreciated that the installation/removal/servicing of any given cross brace 48 and/or tension rod 10 may be performed without removal of the supporting top and bottom base brackets 12, 14 and the support element 16 connected thereto.

A method of installing the column bracket assembly 10 (the "installation method") is also provided. The installation method includes coupling the top base bracket 12 to a supported element 104 via the header bracket 30. The installation method also includes coupling the bottom base bracket 14 to a foundation element (e.g. the footing 102) via the base plate 32. For example, as shown in FIG. 2, bolts or other anchoring fasteners 56 may be used to secure the base plate 32 to the footing 102 (e.g. via holes, slots, or other cut-outs shown at 58). The installation method also comprises coupling one end of the support element 16 to the bracket body 18 of the top base bracket 12, and coupling another end of the support element 16 to the bracket body 18 of the bottom base bracket 14. In certain embodiments, the installation method further comprises coupling one or more cross braces 48 and/or tension rods 10 to the top and/or bottom base brackets 12, 14 and/or mounting plates/brackets 30, 32, via the cross brace mounting brackets 52.

Figure 7:
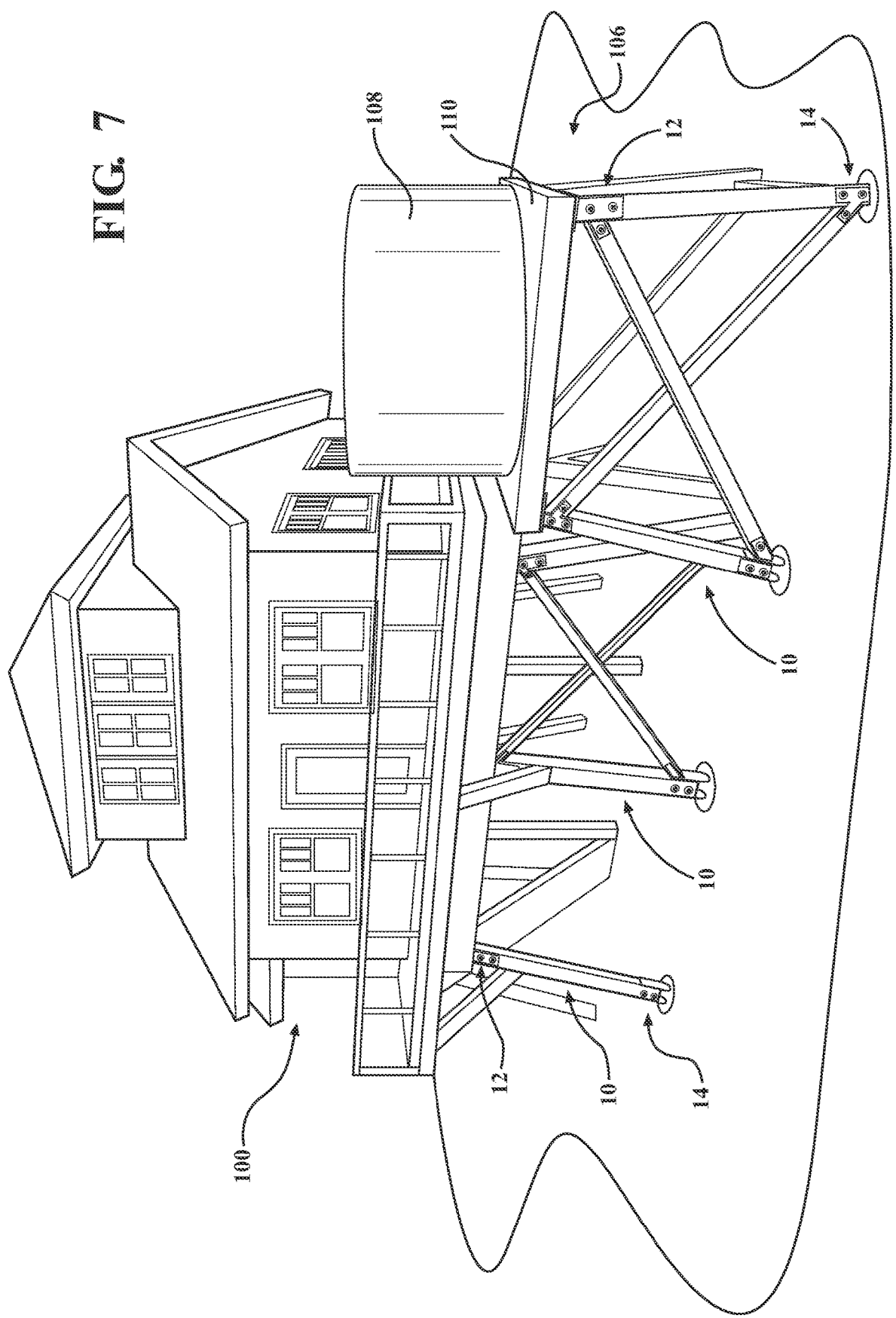
FIG. 7 is a photograph of a model building and adjoining pool structure utilizing column supports, with top and bottom base bracket locations drawn in to show exemplary positions and uses of the column bracket assembly.

A method of repairing, resetting, shoring, and/or leveling a structure (e.g. structure 100, as shown in FIG. 7) with the column bracket assembly 10 (the "supporting method") is also provided, and includes installing the column bracket assembly 10, e.g. via the installation method, on an existing structure having a damaged and/or compromised foundation support system.

The method and elements disclosed herein can be utilized to form new structures, retrofit existing structures, and/or repair or rehabilitate damaged structures (e.g. such as due to corrosion, deterioration, excessive loading, etc.). The structure 100 may be a building, a bridge, a foundation, a house, or the like. Likewise, the supporting element 16 may be present in a variety of locations, such as on, in, or partially in the ground, under or partially under water, and combinations thereof. In certain embodiments, the supporting element 16 is at least partially underground. The term "partially", as used in this context, is used herein to refer to at least a portion of the supporting element 16 being underground.

A structure 100 comprising the column bracket assembly 10 is also provided. In some embodiments, as shown in FIG. 7, the structure 100 is a house. In particular embodiments, the structure is a pool. In specific embodiments, the structure is a water tower pool 106 (i.e., an elevated pool comprising a water barrel 108 for housing swimming water atop a supported element 110 being supported by at least one support element 16 provided in and secured via the column bracket assembly 10.

The present invention has been described herein in an illustrative manner, and it is to be understood that the terminology that has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

The terms "comprising" or "comprise" are used herein in their broadest sense to mean and encompass the notions of "including," "include," "consist(ing) essentially of," and "consist(ing) of." The use of "for example," "e.g.," "such as," and "including" to list illustrative examples does not limit to only the listed examples. Thus, "for example" or "such as" means "for example, but not limited to" or "such as, but not limited to" and encompasses other similar or equivalent examples. The term "about" as used herein serves to reasonably encompass or describe minor variations in numerical values measured by instrumental analysis or as a result of sample handling. Such minor variations may be in the order of ±0-10, ±0-5, or ±0-2.5, % of the numerical values. Further, the term "about" applies to both numerical values when associated with a range of values. Moreover, the term "about" may apply to numerical values even when not explicitly stated.

Generally, as used herein a hyphen "-" or dash "-" in a range of values is "to" or "through"; a ">" is "above" or "greater-than"; a "≥" is "at least" or "greater-than or equal to"; a "<" is "below" or "less-than"; and a "≤" is "at most" or "less-than or equal to." On an individual basis, each of the aforementioned applications for patent, patents, and/or patent application publications, is expressly incorporated herein by reference in its entirety in one or more non-limiting embodiments.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The present invention has been described herein in an illustrative manner, and it is to be understood that the terminology which has been used is intended to be in the nature of words of description rather than of limitation. Many modifications and variations of the present invention are possible in light of the above teachings. The present invention may be practiced otherwise than as specifically described within the scope of the appended claims. The subject matter of all combinations of independent and dependent claims, both single and multiple dependent, is herein expressly contemplated.

What is claimed is:

1. A column bracket assembly for adjustably securing an elongate supporting element between a base and a structure to be supported, the column bracket assembly comprising:
   a bottom brace bracket comprising a bracket body pivotally coupled to a base plate, the bracket body comprising a rear wall and a pair of sidewalls extending from opposing sides of the rear wall to collectively define a 3-sided channel configured to receive a first end portion of the elongate support element, the bracket body further comprising a support shelf at least partially enclosing one end of the channel and configured to abut a first end of the elongate support element when disposed within the channel, the base plate being adapted to be releasably secured to the base; and
   a top brace bracket comprising a mounting body pivotally coupled to a header bracket, the mounting body comprising a rear wall and a pair of sidewalls extending from opposing sides of the rear wall to collectively define a 3-sided channel configured to receive a second end portion the elongate support element, the mounting body further comprising a support shelf at least partially enclosing one end of the channel and configured to abut a second end of the support element when disposed within the channel, the header bracket being adapted to be releasably secured to the structure to be supported;
   wherein the base plate comprises a central through-hole configured to receive a fastener adapted to secure the base plate to the base.

2. The column bracket assembly of claim 1, wherein the bracket body and the base plate of the bottom brace bracket each comprise a pair of bracket tabs, and each bracket tab defines a pivot pin hole, and wherein the bottom brace bracket comprises a pivot pin securable disposed within the pivot pin holes of the bracket tabs to form a pivotal connection between the bracket body and the base plate.

3. The column bracket assembly of claim 1, wherein the bracket body further comprises a cross brace mounting bracket adapted to be pivotally coupled to a cross brace bracket configured to be coupled to an end portion of a cross brace.

4. The column bracket assembly of claim 3, further comprising a cross brace pivotally coupled to the cross brace mounting bracket via the cross brace bracket.

5. The column bracket assembly of claim 1, wherein the base plate defines at least one peripheral alignment slot.

6. The column bracket assembly of claim 5, wherein the base plate defines a series of peripheral alignment slots disposed about an outer portion of the base plate.

7. The column bracket assembly of claim 1, wherein the mounting body and the header bracket of the top brace bracket each comprise a pair of bracket tabs, and each bracket tab defines a pivot pin hole, and wherein the top brace bracket comprises a pivot pin securable disposed within the pivot pin holes of the bracket tabs to form a pivotal connection between the mounting body and the header bracket.

8. The column bracket assembly of claim 1, wherein the mounting body further comprises a cross brace mounting bracket adapted to be pivotally coupled to a cross brace bracket configured to be coupled to an end portion of a cross brace.

9. The column bracket assembly of claim 8, further comprising a cross brace pivotally coupled to the cross brace mounting bracket via the cross brace bracket.

10. The column bracket assembly of claim 1, further comprising the elongate support element, wherein the elongate support element comprises a wooden column.

11. A supported structure comprising the column bracket assembly of claim 1.

12. A method of supporting a structure with the column bracket assembly of claim 1, said method comprising:
   fastening the base plate to a surface of a base, thereby coupling the bottom brace bracket to the base;
   fastening the header bracket to an underside surface of the structure, thereby coupling the top brace bracket to the structure;
   securing a first end portion of an elongate support element within the channel of the bracket body; and
   securing a second end portion of the elongate support element within the channel of the mounting body, thereby installing the column bracket assembly in a load-bearing fashion between the structure and the base and supporting the structure.

13. The method of claim 12, wherein the surface of the base and the underside surface of the structure are not parallel to one another.

14. The method of claim 12, wherein the structure comprises a compromised foundation support system such that the method is further defined as a method of supporting a damaged structure with the column bracket assembly.

15. A supported structure prepared by the method of claim 12.

16. The supported structure of claim 15, wherein the base is further defined as a footing, and wherein the underside surface of the structure is further defined as the bottom face of a support beam.

17. The supported structure of claim 16, wherein the structure is further defined as a house.

18. The supported structure of claim 16, wherein the structure is further defined as a water tower pool comprising a water barrel secured atop an elevated platform supported by the support beam.

19. A column bracket assembly for adjustably securing an elongate supporting element between a base and a structure to be supported, the column bracket assembly comprising:
   a bottom brace bracket comprising a bracket body pivotally coupled to a base plate, the bracket body comprising a rear wall and a pair of sidewalls extending from opposing sides of the rear wall to collectively define a 3-sided channel configured to receive a first end portion of the elongate support element, the bracket body further comprising a support shelf at least partially enclosing one end of the channel and configured to abut a first end of the elongate support element when disposed within the channel, the base plate being adapted to be releasably secured to the base; and
   a top brace bracket comprising a mounting body pivotally coupled to a header bracket, the mounting body comprising a rear wall and a pair of sidewalls extending from opposing sides of the rear wall to collectively define a 3-sided channel configured to receive a second end portion the elongate support element, the mounting body further comprising a support shelf at least partially enclosing one end of the channel and configured to abut a second end of the support element when disposed within the channel, the header bracket being adapted to be releasably secured to the structure to be supported;

wherein the bracket body further comprises a cross brace mounting bracket adapted to be pivotally coupled to a cross brace bracket configured to be coupled to an end portion of a cross brace.

20. The column bracket assembly of claim 19, further comprising a cross brace pivotally coupled to the cross brace mounting bracket via the cross brace bracket.

21. A column bracket assembly for adjustably securing an elongate supporting element between a base and a structure to be supported, the column bracket assembly comprising:
a bottom brace bracket comprising a bracket body pivotally coupled to a base plate, the bracket body comprising a rear wall and a pair of sidewalls extending from opposing sides of the rear wall to collectively define a 3-sided channel configured to receive a first end portion of the elongate support element, the bracket body further comprising a support shelf at least partially enclosing one end of the channel and configured to abut a first end of the elongate support element when disposed within the channel, the base plate being adapted to be releasably secured to the base; and
a top brace bracket comprising a mounting body pivotally coupled to a header bracket, the mounting body comprising a rear wall and a pair of sidewalls extending from opposing sides of the rear wall to collectively define a 3-sided channel configured to receive a second end portion the elongate support element, the mounting body further comprising a support shelf at least partially enclosing one end of the channel and configured to abut a second end of the support element when disposed within the channel, the header bracket being adapted to be releasably secured to the structure to be supported;
wherein the base plate defines at least one peripheral alignment slot.

22. The column bracket assembly of claim 21, wherein the base plate defines a series of peripheral alignment slots disposed about an outer portion of the base plate.

23. A column bracket assembly for adjustably securing an elongate supporting element between a base and a structure to be supported, the column bracket assembly comprising:
a bottom brace bracket comprising a bracket body pivotally coupled to a base plate, the bracket body comprising a rear wall and a pair of sidewalls extending from opposing sides of the rear wall to collectively define a 3-sided channel configured to receive a first end portion of the elongate support element, the bracket body further comprising a support shelf at least partially enclosing one end of the channel and configured to abut a first end of the elongate support element when disposed within the channel, the base plate being adapted to be releasably secured to the base; and
a top brace bracket comprising a mounting body pivotally coupled to a header bracket, the mounting body comprising a rear wall and a pair of sidewalls extending from opposing sides of the rear wall to collectively define a 3-sided channel configured to receive a second end portion the elongate support element, the mounting body further comprising a support shelf at least partially enclosing one end of the channel and configured to abut a second end of the support element when disposed within the channel, the header bracket being adapted to be releasably secured to the structure to be supported;
wherein the mounting body further comprises a cross brace mounting bracket adapted to be pivotally coupled to a cross brace bracket configured to be coupled to an end portion of a cross brace.

24. The column bracket assembly of claim 23, further comprising a cross brace pivotally coupled to the cross brace mounting bracket via the cross brace bracket.

25. A method of supporting a damaged structure with a column bracket assembly, with the column bracket assembly comprising:
a bottom brace bracket comprising a bracket body pivotally coupled to a base plate, the bracket body comprising a rear wall and a pair of sidewalls extending from opposing sides of the rear wall to collectively define a 3-sided channel configured to receive a first end portion of the elongate support element, the bracket body further comprising a support shelf at least partially enclosing one end of the channel and configured to abut a first end of the elongate support element when disposed within the channel, the base plate being adapted to be releasably secured to the base; and
a top brace bracket comprising a mounting body pivotally coupled to a header bracket, the mounting body comprising a rear wall and a pair of sidewalls extending from opposing sides of the rear wall to collectively define a 3-sided channel configured to receive a second end portion the elongate support element, the mounting body further comprising a support shelf at least partially enclosing one end of the channel and configured to abut a second end of the support element when disposed within the channel, the header bracket being adapted to be releasably secured to the damaged structure to be supported;
said method comprising:
fastening the base plate to a surface of a base, thereby coupling the bottom brace bracket to the base;
fastening the header bracket to an underside surface of the damaged structure, thereby coupling the top brace bracket to the damaged structure;
securing a first end portion of an elongate support element within the channel of the bracket body; and
securing a second end portion of the elongate support element within the channel of the mounting body, thereby installing the column bracket assembly in a load-bearing fashion between the damaged structure and the base and supporting the damaged structure;
wherein the damaged structure comprises a compromised foundation support system.

26. A supported structure prepared by a method of supporting a structure with a column bracket assembly, with the column bracket assembly comprising:
a bottom brace bracket comprising a bracket body pivotally coupled to a base plate, the bracket body comprising a rear wall and a pair of sidewalls extending from opposing sides of the rear wall to collectively define a 3-sided channel configured to receive a first end portion of the elongate support element, the bracket body further comprising a support shelf at least partially enclosing one end of the channel and configured to abut a first end of the elongate support element when disposed within the channel, the base plate being adapted to be releasably secured to the base; and
a top brace bracket comprising a mounting body pivotally coupled to a header bracket, the mounting body comprising a rear wall and a pair of sidewalls extending from opposing sides of the rear wall to collectively define a 3-sided channel configured to receive a second end portion the elongate support element, the mounting body further comprising a support shelf at least partially enclosing one end of the channel and configured to abut a second end of the support element when disposed within the channel, the header bracket being adapted to be releasably secured to the structure to be supported;

said method comprising:

fastening the base plate to a surface of a base, thereby coupling the bottom brace bracket to the base;

fastening the header bracket to an underside surface of the structure, thereby coupling the top brace bracket to the structure;

securing a first end portion of an elongate support element within the channel of the bracket body; and securing a second end portion of the elongate support element within the channel of the mounting body, thereby installing the column bracket assembly in a load-bearing fashion between the structure and the base and supporting the structure.

27. The supported structure of claim 26, wherein the base is further defined as a footing, and wherein the underside surface of the structure is further defined as the bottom face of a support beam.

28. The supported structure of claim 27, wherein the structure is further defined as a house.

29. The supported structure of claim 27, wherein the structure is further defined as a water tower pool comprising a water barrel secured atop an elevated platform supported by the support beam.

* * * * *